United States Patent [19]
Stent et al.

[11] Patent Number: 5,285,400
[45] Date of Patent: Feb. 8, 1994

[54] DATA PROCESSING SYSTEM WITH USER DEFINABLE MATHEMATICAL FUNCTIONS AND A METHOD FOR USING SAME

[75] Inventors: Robert J. Stent, Westford; Pennie K. Locklear, Groton, both of Mass.

[73] Assignee: Davox Corporation, Billerica, Mass.

[21] Appl. No.: 798,239

[22] Filed: Nov. 26, 1991

[51] Int. Cl.[5] .............................................. G06F 3/00
[52] U.S. Cl. ................................................ 364/709.14
[58] Field of Search ............. 364/706, 709.01, 709.09, 364/709.14, 406, 408; 235/381

[56] References Cited

U.S. PATENT DOCUMENTS

4,145,742  3/1979  Olander, Jr. et al. ............... 364/709
4,902,881  2/1990  Janku ................................... 235/381

OTHER PUBLICATIONS

"Excel in Business" by Douglas Cobb and Allan McGuffer, 1989, p. 94.

*Primary Examiner*—Jerry Smith
*Assistant Examiner*—Chuong D. Ngo
*Attorney, Agent, or Firm*—Daniel J. Borque

[57] ABSTRACT

A user definable mathematical function is implemented on a data processing system including a data terminal. The user definable mathematical function includes a user definable mathematical formula having at least one operand which is as yet unspecified or undetermined, but which will be retrieved from a source or location specified in the mathematical function. Execution of the user defined mathematical function is initiated by a data terminal selector device associated with the user definable mathematical function. Upon execution of the user defined mathematical function, a variable value is retrieved from the specified source and substituted for the unspecified operand in the user defined mathematical formula. The user defined mathematical formula is executed and a result of the execution provided. A method for providing and using such a user definable mathematical function is also provided.

13 Claims, 2 Drawing Sheets

DATA PROCESSING SYSTEM WITH USER DEFINABLE MATHEMATICAL FUNCTIONS AND A METHOD FOR USING SAME

FIELD OF THE INVENTION

This invention relates to data processing systems and more particularly, to a data processing system implementing user definable mathematical functions.

BACKGROUND OF THE INVENTION

Many data processing systems require an operator to perform real-time or on-line mathematical functions such as addition, subtraction, multiplication, division and number comparison. Such a need arises, for example, in credit collection operations wherein an operator must calculate a repayment schedule for a client's outstanding balance based upon the client's ability to meet an agreed upon monthly payment, or the client's desire to pay the balance owed over a selected period of time.

Most prior art systems have generally been preprogrammed to automatically provide a single, fixed calculation or mathematical function. This function or calculation is typically performed by an applications program such as a program that calculates a client's minimum monthly payment based on his or her account balance. Unfortunately however, such systems are inflexible and do not allow the operator to easily perform an additional calculation or mathematical function when requested by the client to better suit the client's needs.

To perform an additional mathematical function or calculation, an operator must either use a calculator; access a separate amortization or payment program; or access one or more printed sheets or tables with the selected mathematical formula precomputed for selected operands. Such systems are inflexible to varying operands and further, are prone to operator error requiring considerably more operator time, thereby reducing operator and system efficiency and performance.

SUMMARY OF THE INVENTION

Accordingly, this invention features a versatile data processing system embodying a user definable mathematical function wherein input to a mathematical formula is indirect, allowing the user tremendous choice on the source of the data. The data processing system includes means for defining at least one mathematical function to be performed by the data processing system. The mathematical function includes at least one mathematical formula. The mathematical formula further includes at least one unspecified or undetermined operand. Each unspecified or undetermined operand identifies or indicates, for each unspecified operand, a predetermined source such as a data terminal screen coordinate or memory location associated with the unspecified operand, from which the unspecified operand is to be retrieved. A variable value associated with the predetermined source contains the data to be retrieved and substituted for the unspecified operand upon selection and execution of the mathematical function.

In the preferred embodiment, the predetermined source includes a predetermined data terminal screen coordinate whose displayed variable value is retrieved and substituted for the unspecified operand. The predetermined source may also include a data base, memory, and the data terminal keyboard. The present invention includes means for associating the defined mathematical function with a preselected selector device on the data terminal. The user defined mathematical function is selected and executed upon the selection of the keyboard selector device associated with the user defined mathematical function.

In response to the selection of the user defined mathematical function, means are provided for retrieving the variable value associated with the at least one undetermined or unspecified operand, and for substituting the retrieved variable value for the unspecified operand in the mathematical formula. There are means for executing the mathematical formula in response to the retrieved variable value substituted for the unspecified operand. The means for executing also provides a result of the execution of the user defined mathematical function.

In a preferred embodiment, the data terminal selector device includes a data terminal keyboard button and a data terminal telephone set. The user definable mathematical function includes a mathematical formula having plurality of unspecified operands as well as a corresponding plurality of associated predetermined data terminal screen coordinates whose associated values are to be substituted for each of the plurality of associated unspecified operands. Further, a mathematical formula may include at least one user specified operand.

The variable value associated with each predetermined data terminal screen coordinate is stored in a corresponding predetermined data terminal memory location associated with each data terminal screen coordinate. Similarly, the result provided by the execution of the user definable mathematical function is stored in yet another predetermined data terminal memory location. The user definable mathematical function of the present invention is also adapted to display, at another predetermined data terminal screen coordinate, the result data stored in the associated data terminal memory. Alternatively, the result may also be sent to a host.

This invention also features a method for providing and implementing at least one user definable mathematical function executable on a data processing system. The method includes user defining at least one user definable mathematical function including a mathematical formula having at least one unspecified operand and at least one predetermined data source.

The user defined mathematical function is associated with at least one predetermined selectable data terminal selector device. Execution of the user defined mathematical function is initiated upon the selection of the associated data terminal selector device. Execution of the user defined mathematical function includes retrieving the variable value associated with the predetermined data source and substituting the retrieved value for the unspecified operand in the mathematical formula. Subsequently, the mathematical formula is executed and a result provided.

DESCRIPTION OF THE DRAWINGS

These, and other features and advantages of the present invention will be better understood by reading the following detailed description, taken together with the drawings wherein.

DETAILED DESCRIPTION OF THE INVENTION

Figure 1:
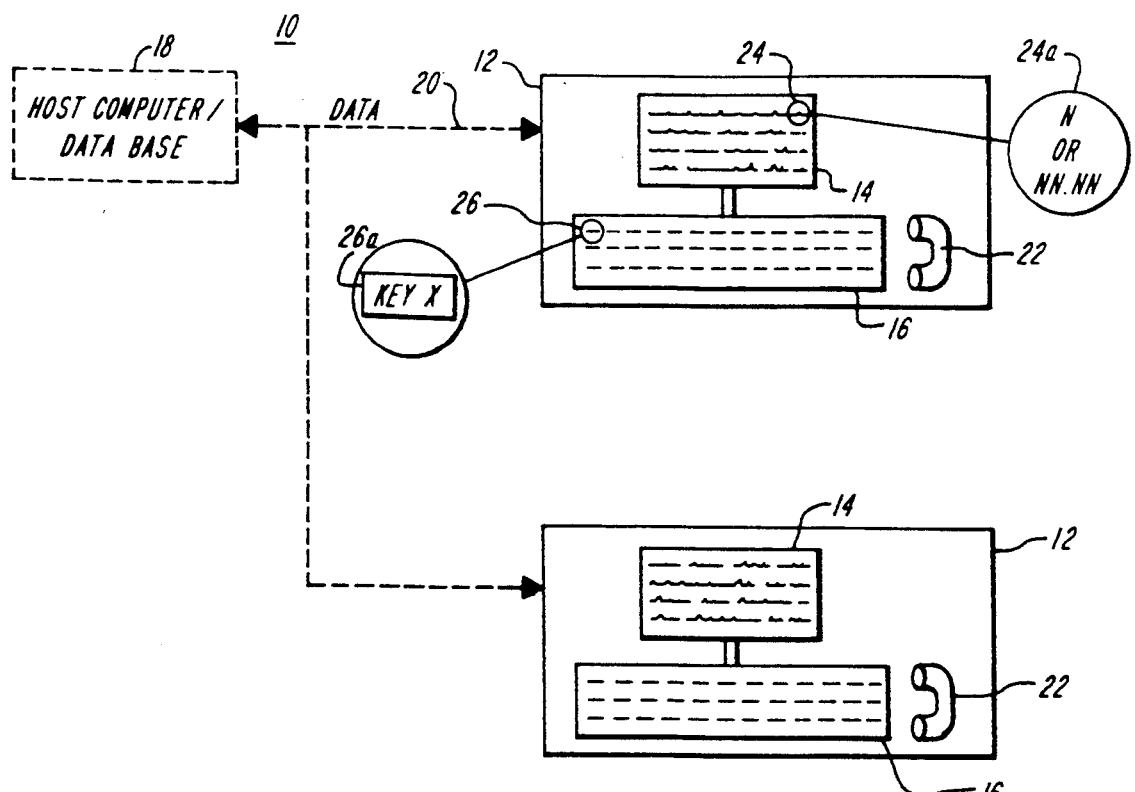
FIG. 1 is a schematic representation of a data processing system including the user definable mathematical function according to the present, invention.

An exemplary data processing system on which may be implemented the user definable mathematical function according to the present invention is shown in FIG. 1. Such a data processing system 10 typically includes one or more data terminals 12. As a minimum, each data terminal includes a display screen 14 and keyboard 16. The terminal may further include data storage and data processing means (not shown) as is well known in the art, an example of which is a personal computer which may include a data base and memory.

Alternatively, the data terminals 12 may be coupled to a host computer and host database 18 by means of data path 20. In addition, the data terminals 12 may be enhanced workstations which may also include other data reception and transmission devices such as, for example, telephone set 22. An example of such an enhanced workstation is the DAVOX 5900 workstation which integrates a video terminal, programmable keyboard, and telephone into one unit available from Davox Corporation, Billerica, MA.

As is well known to those skilled in the art, data terminal screen 14 includes a plurality of fields such as field 24 (shown in greater detail at 24a). Each field is defined to include single or multiple positions. A requirement of the present invention is that the data terminal 12 include a user definable function selector. Such a function selector includes keyboard 16 which includes one or more programmable keys such as key or Smart Button TM (Trademark of Davox Corporation) 26 (shown in greater detail at 26a). A programmable key allows the user to define the functionality of the referenced key. Such functionality, also called a workstation programmable function, may include, in addition to the user definable mathematical function of the present invention, functions such as transmitting data to a host computer, notifying a supervisor of operator availability, or automatically preparing a letter or other form. Smart Button TM or workstation programmable functions are user programmable using a terminal editor, and stored in the terminal's memory. Additionally, the Smart Button TM may also be programmed by down loading the corresponding commands and/or data from a host or the system manager's terminal. Thus, Smart Button TM may be selectively programmed for each operator or for each job which is executing. Such workstation programmable functions are also described in co-pending U.S. Pat. No. 5,164,981 and U.S. patent application No. 07/798,241 assigned to the assignee of the present invention and incorporated herein by reference.

Before being invoked or executed, the user definable mathematical function of the present invention must be defined. Since all mathematical functions require input data which, in a data processing system typically is received from a database or alternatively, from a keyboard, the user or more likely, a system administrator, must define the mathematical function including a mathematical formula as well as the predetermined location or locations from which the formula is to retrieve its operands. Thus, one feature of the present invention is the ability of the user definable mathematical function to obtain and utilize data from sources such as the data terminal screen without operator assistance or intervention. Such user defining of a mathematical function is typically accomplished on a data terminal such as terminal 12.

Figure 2A:
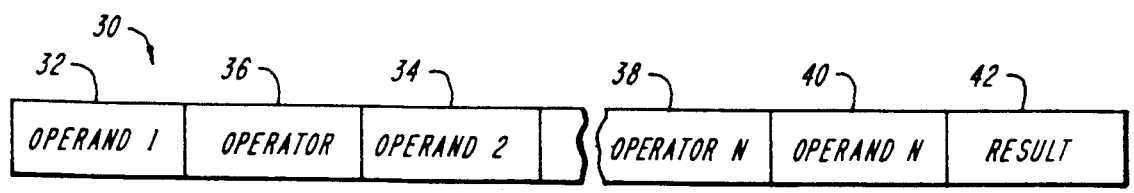
FIGS. 2A and 2B illustrate embodiments of a mathematical formula which form part of the user definable mathematical function of the present invention.

An example of a mathematical formula which forms part of the use definable mathematical function of the present invention is illustrated in FIG. 2A wherein mathematical formula 30 includes at least first and second operands 32, 34 respectively, separated by an operator 36. Operator 36 defines the mathematical operation or relationship to be tested using the first and second operands. Such operations include addition, subtraction, multiplication, division, percentage and greater than or less than. The first and second operands may include positive or negative numbers, decimal points, and place separators such as commas. Dollar signs and other non-numeric characters are automatically disregarded. One or more additional operators 38 and operands 40 may also be included.

User definable mathematical function 30 allows the user to specify where the results of the mathematical operation will be stored in the location indicated by result segment 42. Typically, the result is stored in a data terminal memory location for later display on the data terminal screen. Additionally or alternatively, the data may be stored in memory for later use by a host computer or an applications program.

Figure 2B:
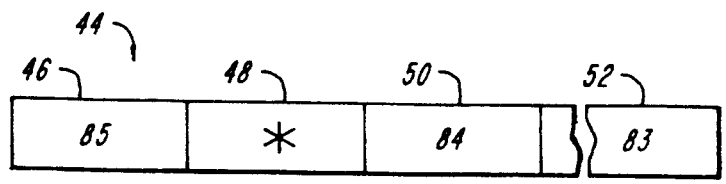

Another example of a mathematical formula of the user defined mathematical function according to the present invention is illustrated by mathematical formula 44, FIG. 2B, wherein a first operand 46, stored in memory location 85 is to be multiplied, as indicated by operator 48, by second operand 50 stored in memory location 84. The results are to be stored in memory location 83 illustrated by result segment 52.

An example of the user defined mathematical function according to the present invention is illustrated in Table I reproduced below.

TABLE I

| | |
|---|---|
| 1. Save 85 (R,C,L) | [balance owed] |
| 2. Save 84 (R,C,L) | [monthly interest] |
| 3. Math (85; *; 84; 83) | |
| 4. Retrieve 83 (R,C) | |

We will assume for this example, that the mathematical formula illustrated in FIG. 2B calculates the monthly interest payment on a balance owed by a customer. Thus, in line 1 of Table I, the system administrator of the data processing system specifies the source of the first operand, which will be stored in data terminal memory or director location identified by the number 85, by defining the coordinates of the data terminal screen from which the value is to be retrieved.

For this example, a balance owed will become the first operand and will be retrieved at the indicated row (R) and column (C) coordinates of the data terminal display screen, and will have a predetermined length (L). Accordingly, when the user definable mathematical function is executed, the execution unit will save the value, of predetermined length "L" displayed at the indicated row (R) and column (C) on the data terminal display screen, in data terminal memory location identified as 85. In reality, the value displayed on the data terminal display screen will be copied from the data terminal memory location(s) in which the data is stored when being displayed on the screen at the location indicated by the R and C designation.

Similarly, line 2 of Table I specifies the source of the second operand to be stored in the memory location identified as number 84, by defining the row (R), the column (C), and the length (L) of the data to serve as the second operand. For this example, this value would be the coordinate on the data terminal screen wherein the monthly interest is displayed. It is important to note that both the balance owed and the monthly interest rate which are displayed on the user's data terminal display screen would have previously been received from a data storage unit such as a database in the data terminal itself, a host computer, or an external database as previously described.

The user definable mathematical formula is illustrated in line 3 and begins with the key word "math" and corresponds to the format of the user defined mathematical formula 44 illustrated in FIG. 2B. Execution of the mathematical formula is performed by an execution unit typically including a microprocessor and associated circuitry which may be resident in the data terminal or in the host as is well known in the art. The result of the execution of the mathematical formula will be stored in a memory location identified as 83.

Additionally, the user may wish to display the result of the mathematical function. Thus, line 4 of Table I illustrates a command wherein the data terminal "retrieves" from the memory location identified as 83 the "result" value which is to be displayed on the data terminal screen at the associated row (R) and column (C) contained within the instruction.

Thus, the user definable mathematical function according to the present invention allows the user (system administrator or manager) to define one or more operands, the mathematical formula desired, and any requested action on the result of execution of the mathematical function. This information is then assigned to a given data terminal selector, such as a terminal key (Smart Button) or telephone hand set. Thus, by simply depressing one key, the operator instructs the execution unit to perform the preselected mathematical function on the one or more predefined but unspecified operands, relieving the operator of keying in any information as would be required if using a calculator.

Defining the user definable mathematical function of the present invention is accomplished utilizing a conventional screen editor as is known to those skilled in the art, in conjunction with an applications or operating program which allows the system or the data terminal to selectably assign or associate a mathematical function with a data terminal selector such as a terminal key or telephone hand set.

In addition to the "save" command described above which stores a variable from a predetermined data terminal screen position for use by the mathematical formula included within the user definable mathematical function of the present invention, data may also be retrieved from a memory location after being input from the data terminal keyboard, and/or a data base. Such a system requires the user or system administrator to load one of the operands in the data terminal memory prior to executing the user defined mathematical function. This allows the user to predefine a constant such as an interest rate, or a job-by-job or terminal-by-terminal basis.

Figure 3:
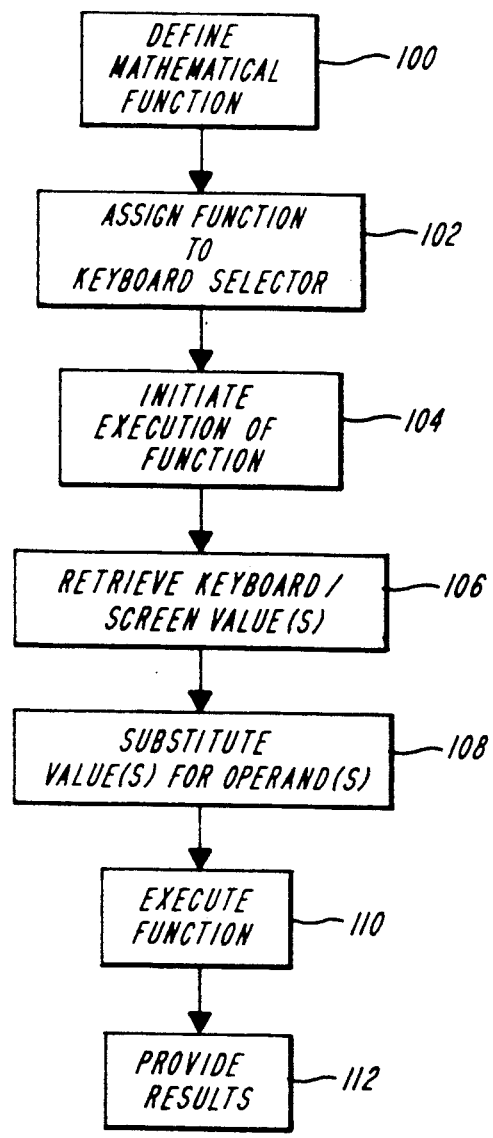
FIG. 3 is a flowchart illustrating the method for providing and executing a user definable mathematical function according to the present invention.

A method of providing and executing the user definable mathematical function according to the present invention is illustrated in FIG. 3 wherein at step 100, the user first defines the mathematical function as described above. At step 102, the defined mathematical function is assigned to a keyboard selector. The keyboard selector may include a data terminal key (Smart Button TM) or other data terminal device such as a telephone hand set or apparatus, or the mere request for access to a data base. Thus, a predetermined user definable mathematical function may be executed each time a telephone receiver is taken off-hook (picked-up) or placed back on-hook (hung-up), step 104. In addition to a keyboard button or other keyboard selector, initiation of execution of the user definable mathematical function as indicated at step 104 may be performed by another applications program, or by another workstation programmable function previously assigned to another predetermined keyboard key, which in turn calls or initiates execution of the user defined mathematical function.

After initiating execution of the user defined mathematical function, the mathematical function retrieves any missing undefined operands from the predetermined source as directed by the function, step 106. Subsequently, the retrieved value(s) are substituted for the operand, step 108 and the mathematical formula executed, step 110. After execution of the mathematical formula, the results are provided, step 112, either to a predetermined memory location and/or printed to the data terminal screen.

Modifications and substitutions by one of ordinary skill in the art are considered to be within the scope of the present invention which is not to be limited except by the claims which follow.

We claim:

1. A data processing system including at least one user definable mathematical function associated with at least one predetermined user selectable data terminal selector device, for providing said at least one user definable mathematical function to presently displayed data generated by at least one data processing application program currently operating on one of said data processing system and a coupled host processing system, said data processing system comprising:

a data terminal including at least a data terminal screen and at least one selector device, said data terminal screen presently displaying data generated by said at least one data processing application program, said data generated independently of and external to said user definable mathematical function included on said data processing system, said at least one selector device operable for initiating execution of said at least one user definable mathematical function in response to selection of said at least one selector device;

means for user defining at least one user definable mathematical function, said user definable mathematical function including at least one user definable mathematical formula having at least one unspecified operand, said at least one unspecified operand identifying at least one predetermined operand data source associated with said at least one unspecified operand, and from which said data is to be retrieved, said at least one predetermined operand data source including at least a first predetermined data terminal screen coordinate, said at least a first predetermined data terminal screen coordinate presently displaying said data generated independently of and external to said user definable mathematical function;

means, responsive to the selection of said user selectable data terminal selector device, for initiating execution of said user definable mathematical function including automatically retrieving said data directly from said at least one predetermined data terminal screen coordinate, and for substituting said retrieved data for said at least one unspecified operand in said mathematical formula; and means, responsive to said means for initiating execution, for retrieving and for substituting, for providing a result of the execution of said user definable mathematical function.

2. The system of claim 1 wherein said data terminal selector device includes at least one data terminal keyboard button.

3. The system of claim 1 wherein said data terminal selector device includes a data terminal telephone set.

4. The system of claim 1 wherein said user definable mathematical function includes a mathematical formula having a plurality of unspecified operands, and a corresponding plurality of predetermined data terminal screen coordinates whose associated presently displayed data are to be substituted for each of said corresponding plurality of unspecified operands.

5. The system of claim 1 wherein said user definable mathematical formula includes at least one user specified operand.

6. The system of claim 1 wherein said at least one operand associated with said at least first predetermined data terminal screen coordinate is stored in at least one first predetermined data terminal memory location associated with said first predetermined data terminal screen coordinate.

7. The system of claim 6 wherein said means for providing a result of the execution of said user definable mathematical function stores said result in at least one second predetermined data terminal memory location associated with at least one second predetermined data terminal screen coordinate.

8. The system of claim 8 wherein said means for executing said user defined mathematical formula and for providing a result retrieves said result form said at least one second predetermined data terminal memory location and displays said result at said at least one second predetermined data terminal screen coordinate along with at least said at least one operand displayed at said first predetermined data terminal screen coordinate.

9. The system of claim 1 wherein said data processing system includes a host computer; and wherein said host computer includes said means for executing said user defined mathematical function and for providing said result of the execution of the user definable mathematical function.

10. The system of claim 1 wherein said data terminal includes said means for executing said user defined mathematical function and for providing said result of the execution of the user definable mathematical function.

11. The system of claim 1 wherein said means for user defining said mathematical function includes a data terminal.

12. The system of claim 1 wherein said result is provided to a host computer.

13. A method for providing and implementing at least one user definable mathematical function, said at least one user definable mathematical function executable on a data processing system including at least one data terminal presently displaying data generated independently of said at least one user definable mathematical function by at least one data processing application program currently operating on one of said data processing system and a coupled host processing system, said method comprising the steps of:

user defining at least one user definable mathematical function to be executed by said data processing system, said user definable mathematical function including a mathematical formula having at least one unspecified operand identifying at least one predetermined operand data source, said at least one predetermined operand data source providing an associated variable value to be retrieved and substituted for said at least one unspecified operand upon execution of said user definable mathematical function and serving as at lest one operand for said mathematical formula, said at least one predetermined operand data source including at least a first predetermined data terminal screen coordinate, said at least a first predetermined data terminal screen coordinate presently displaying data generated independently of and external to said at least one user definable mathematical function;

initiating execution of said user definable mathematical function on said data processing system upon selection of an associated data terminal selector device;

retrieving said variable value associated with said at least one predetermined data source identified by said at least one unspecified operand directly from said at least first predetermined data terminal screen coordinate;

substituting said retrieved variable value for said at least one unspecified operand in the mathematical formula of said user definable mathematical function;

executing said mathematical formula; and providing a result of the execution of said user definable mathematical function by said data processing system to a second predetermined data terminal screen coordinate position while displaying at least said variable value at said first predetermined data terminal screen coordinate.

* * * * *